United States Patent
Moon

(10) Patent No.: US 10,110,043 B2
(45) Date of Patent: Oct. 23, 2018

(54) WIRELESS POWER TRANSMISSION DEVICE AND WIRELESS CHARGING METHOD

(71) Applicant: Samsung Electronics Co., Ltd, Suwon-si (KR)

(72) Inventor: Jung Nam Moon, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 15/052,639

(22) Filed: Feb. 24, 2016

(65) Prior Publication Data

US 2016/0254693 A1 Sep. 1, 2016

(30) Foreign Application Priority Data

Feb. 27, 2015 (KR) .................. 10-2015-0028127

(51) Int. Cl.
| | |
|---|---|
| *H02J 7/00* | (2006.01) |
| *H02J 7/02* | (2016.01) |
| *G06F 1/16* | (2006.01) |
| *H04M 1/04* | (2006.01) |
| *H02J 7/04* | (2006.01) |
| *H02J 50/12* | (2016.01) |

(52) U.S. Cl.
CPC ............ *H02J 7/025* (2013.01); *G06F 1/1632* (2013.01); *H02J 7/04* (2013.01); *H02J 50/12* (2016.02); *H04M 1/04* (2013.01); *H02J 7/0027* (2013.01); *H02J 7/0044* (2013.01)

(58) Field of Classification Search
CPC ..................................................... H02J 7/025
USPC ........................................................ 320/108
See application file for complete search history.

(56) References Cited

U.S. PATENT DOCUMENTS

| | | | |
|---|---|---|---|
| 2008/0079388 A1* | 4/2008 | Sarnowsky | H02J 7/0042 320/103 |
| 2009/0108801 A1* | 4/2009 | Kozisek | H04M 1/0258 320/103 |
| 2010/0259215 A1* | 10/2010 | Sip | H02J 7/025 320/108 |
| 2013/0093220 A1 | 4/2013 | Pajic | |
| 2013/0307470 A1 | 11/2013 | Watanabe et al. | |
| 2013/0335900 A1 | 12/2013 | Jang | |
| 2014/0117926 A1 | 5/2014 | Hwu et al. | |
| 2014/0176062 A1 | 6/2014 | Jung | |
| 2014/0239888 A1 | 8/2014 | Chen | |
| 2014/0373758 A1 | 12/2014 | Pajic | |

(Continued)

FOREIGN PATENT DOCUMENTS

| | | |
|---|---|---|
| EP | 2747236 A1 | 6/2014 |
| KR | 20140133164 A | 11/2014 |
| WO | WO 2011/079344 A1 | 7/2011 |

OTHER PUBLICATIONS

Extended European Search Report dated Jul. 22, 2016 in connection with European Application No. 16154203.0, 11 pages.

*Primary Examiner* — Suresh Memula

(57) ABSTRACT

A wireless power transmission device includes a holder including a charger disposed therein and charging the electronic device, a supporter supporting the holder, and a connector connecting the holder to the supporter and applying an external force to the holder such that an upper surface of the holder forms a predetermined angle with a lower surface of the supporter.

19 Claims, 21 Drawing Sheets

(56) References Cited

U.S. PATENT DOCUMENTS

2016/0023766 A1    1/2016   Pajic
2016/0114891 A1    4/2016   Pajic

\* cited by examiner

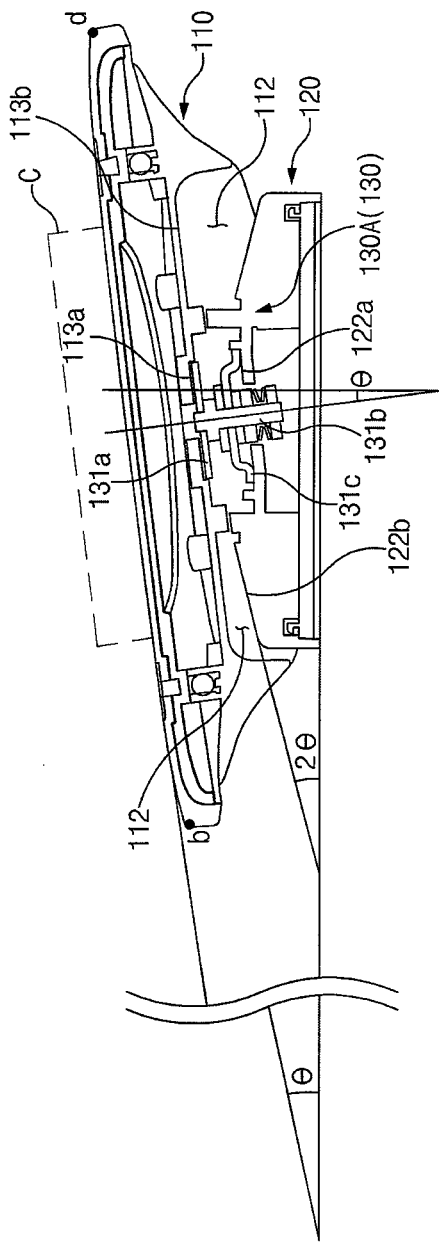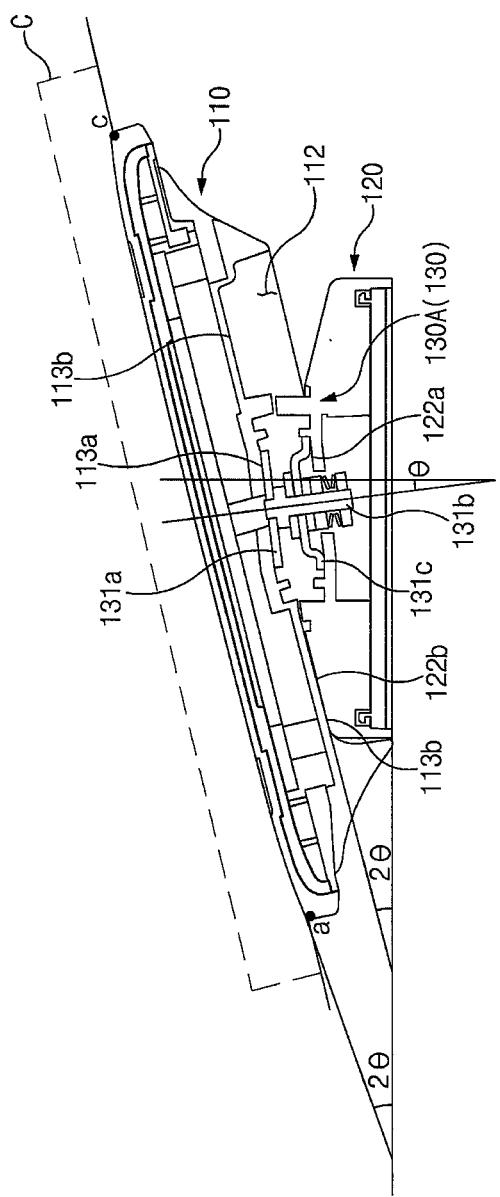
FIG. 10C
FIG. 10D

WIRELESS POWER TRANSMISSION DEVICE AND WIRELESS CHARGING METHOD

CROSS-REFERENCE TO RELATED APPLICATION(S) AND CLAIM OF PRIORITY

The present application is related to and claims the benefit under 35 U.S.C. § 119(a) of a Korean patent application filed on Feb. 27, 2015 in the Korean Intellectual Property Office and assigned Serial number 10-2015-0028127, the entire disclosure of which is hereby incorporated by reference.

TECHNICAL FIELD

The present disclosure relates to a wireless power transmission device and a wireless charging method.

BACKGROUND

As an electronic communication technology advances, a wireless charging device with various functions and forms has been developed. In recent years, in order to satisfy the desire of customers to buy the wireless charging device, manufacturers tend to gradually improve usability of the wireless charging device and to enhance design aspect of the wireless charging device.

Moreover, manufacturers are required to solve problems, such as deterioration in visibility of a screen of an electronic device, which is caused by the use of the wireless charging device, deterioration in charging efficiency due to an alignment between the electronic device and the wireless charging device, etc.

A conventional PAD-type wireless power transmission device is disposed to make contact with a bottom surface, and thus a user does not easily see the screen of the electronic device in a case where the electronic device is mounted on an upper surface.

In addition, the charging efficiency of the electronic device is deteriorated in the case where a mount-type wireless power transmission device manufactured to be disposed in a height direction is mounted in a width direction, and the user is difficult to see the screen of the electronic device at a desired angle as the PAD-type wireless power transmission device since the electronic device is not free to switch an angle.

SUMMARY

To address the above-discussed deficiencies, it is a primary object to provide at least the advantages described below. Accordingly, an aspect of the present disclosure is to provide a wireless power transmission device capable of allowing an angle of a holder to be set to a predetermined angle with respect to a bottom surface without separating the electronic device from the holder and moving the electronic device after the electronic device is mounted on the holder.

In accordance with an aspect of the present disclosure, a wireless power transmission device including a holder including a charger disposed therein and charging the electronic device, a supporter supporting the holder, and a connector connecting the holder to the supporter and applying an external force to the holder such that an upper surface of the holder forms a predetermined angle with a lower surface of the supporter.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A, 10B, 10C, and 10D are an exploded perspective views showing a wireless power charging device according to various embodiments of the present disclosure;

Throughout the drawings, it should be noted that like reference numbers are used to depict the same or similar elements, features, and structures.

DETAILED DESCRIPTION

Figures 1A, 1B:
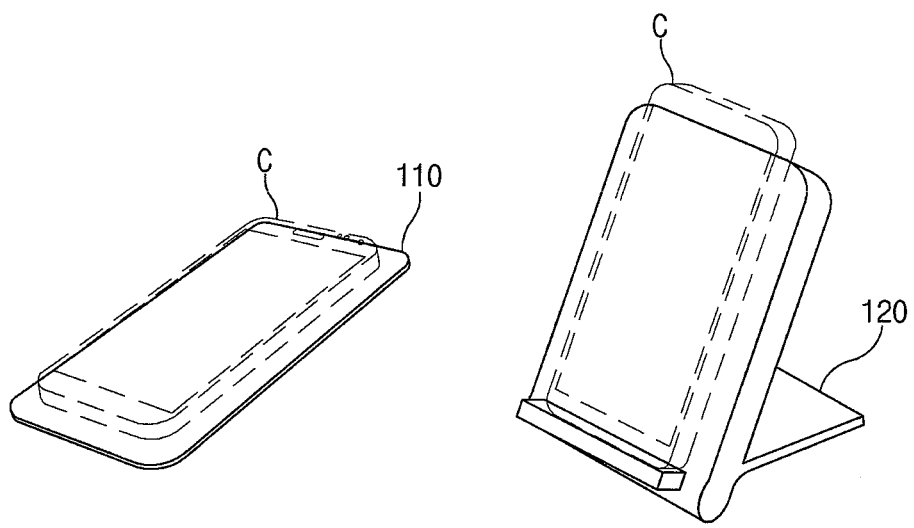
FIGS. 1A and 1B are perspective views showing a wireless power charging device according to various embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless power transmission device. Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), the element can be directly coupled with/to or connected to the other element or an intervening element (e.g., a third element) may be present. In contrast, when an element (e.g., a first element) is referred to as being "directly coupled with/to" or "directly connected to" another element (e.g., a second element), the element should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic. Also, electronic devices according to various embodiments of the present disclosure are not limited to the above-mentioned devices, and may include new electronic devices according to technology development Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

Referring to FIGS. 1A, 1B, 2A and 2B, a wireless power transmission device 100 may include a holder 110 including a charger 170 disposed therein to charge an electronic device, a supporter 120 supporting the holder 110, and a connector 130 connecting the holder 110 and the supporter 120.

According to various embodiments, the holder 110 may include an upper surface, which is flat to allow an electronic device c, such as a mobile phone, to be placed on the upper surface, and include the charger 170 disposed therein to charge the electronic device c placed on the upper surface. In FIGS. 1A, 1B, 2A, and 2B, the holder 110 and the supporter 120 may have a substantially circular shape when viewed in a plan view, but the shapes of the holder 110 and the supporter should not be limited to the circular shape, as shown in FIGS. 1A and 1B.

According to various embodiments, the charger 170 may include a first coil part 171, in which a coil is formed, to transmit a power applied thereto to the electronic device placed on the upper surface using a magnetic induction phenomenon.

The electronic device placed on the upper surface may include a second coil part (not shown) disposed at a position corresponding to the first coil part 171 and an induced current may flow through the second coli part (not shown) due to an induced electromotive force generated by the first coil 171.

In addition, the electronic device may be charged with the induced current flowing through the second coil part (not shown), and thus the electronic device may be charged in a wireless charging scheme even though the electronic device is not connected to an external power source in a wired charging scheme.

Figure 3:
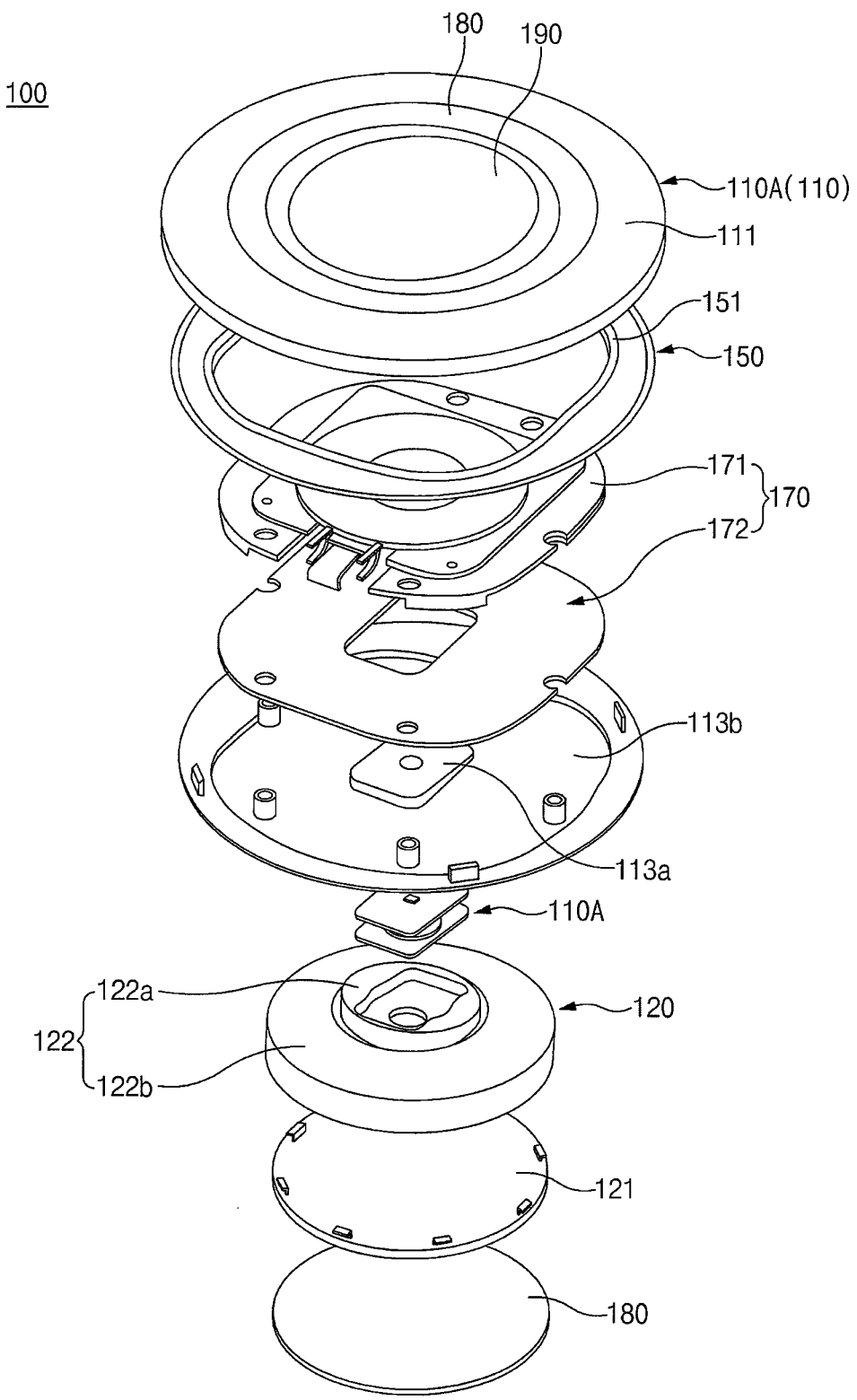
FIG. 3 is a plan view and a rear view showing a wireless power charging device according to various embodiments of the present disclosure.
Figures 4A, 4B:
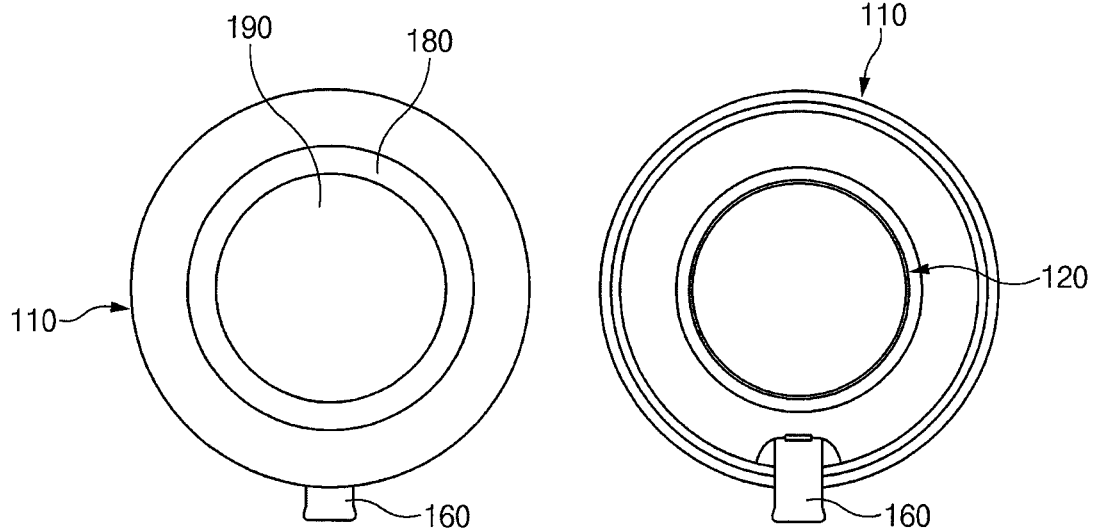
FIGS. 4A and 4B are a top and a bottom views showing a wireless power charging device according to various embodiments of the present disclosure.

Referring to FIGS. 3, 4A, and 4B, the holder 110 or the supporter 120 may include an external power input terminal, e.g., a USB input terminal, and provide an external power to the charger 170 through the external power input terminal.

According to various embodiments, the holder 110 may include a non-slip member 180, e.g., a rubber, disposed on the upper surface such that the electronic device placed on the upper surface is not slipped while being charged. According to various embodiments, the non-slip member 180 may have a structure to prevent or avoid the electronic device placed on the upper surface of the holder 110 from slipping off. To this end, the non-slip member 180 may include a member having a high friction force as the rubber or an adhesive member having a low adhesive force.

According to various embodiments, the holder 110 may include an electronic component including the second coil part (not shown) for the internal wireless charging operation as a case forming an upper end appearance on which the electronic device is placed, and may include a material having a low dielectric constant, such as a plastic material, to allow a magnetic field generated therein to transmit through the case. In addition, according to various embodiments, the holder 110 may include a heat discharging member 190 including a metal material with a high heat conductivity, e.g., copper, to discharge heat generated from the charger 170.

According to various embodiments, the heat discharging member 190 may be the metal material having the high heat conductivity, e.g., copper, a heat discharging sheet, e.g., graphite, or a thermoelectric element. According to various embodiments, the heat discharging member 190 may distribute or cool down the heat generated during the charging operation.

Referring to FIGS. 2A, 2B, 4A, and 4B, the supporter 120 according to various embodiments may include a lower surface, which makes contact with the bottom surface and is substantially flat to support the holder 110. To prevent or avoid the supporter 120 from slipping on and separated from the upper surface, the non-slip member 180, which enhances the frictional force between the lower surface of the supporter 120 and the bottom surface, e.g., a rubber micro suction, may be attached to the lower surface. The term "bottom surface" used herein may mean a surface on which the lower surface of the supporter 120 is placed, e.g., a desk, a table, etc., but it should not be limited thereto or thereby as long as the wireless power transmission device 100 may be placed.

In addition, the supporter 120 according to various embodiments may be coupled with the holder 110 to define a space therein and an electrical component, which may be arranged in the holder 110, may be further disposed in the space. For example, an interface component, e.g., a USB, may be disposed in the space and electrically connected to the holder 110 through a component, such as an upper PBA, an FPCB, etc. As another example, the heat may be generated around the PBA component during the charging or fast charging. Therefore, a heat discharging component, e.g., a heat discharging fan, may be further disposed in the space to cool down the heat.

According to various embodiments, the connector 130 may connect the holder 110 and the supporter 120 to allow the upper surface of the holder 110 to form the predetermined angle with respect to the lower surface of the supporter 120 when the supporter 120 is placed on the bottom surface. Hereinafter, the wireless power transmission device 100 including the connector 130 according to various embodiments will be described in detail.

Figure 5:
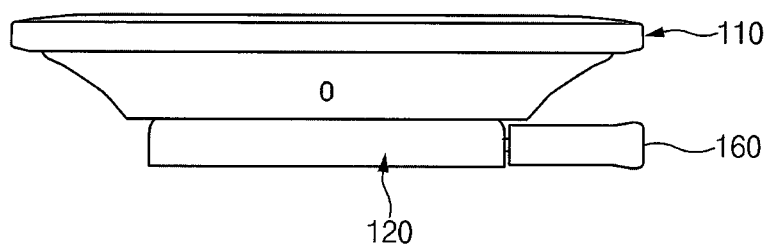
FIG. 5 is a perspective view showing a holder according to various embodiments of the present disclosure.
Figure 7A:
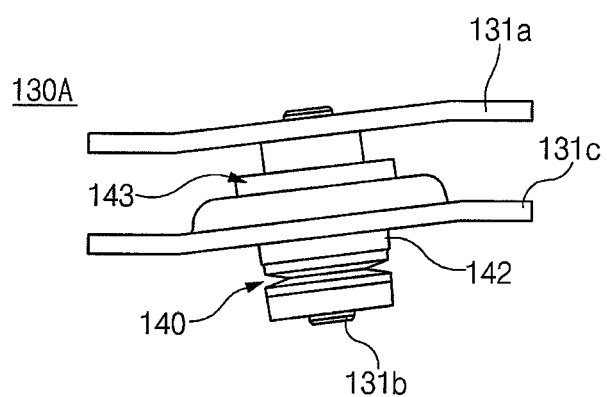
FIGS. 7A and 7B are perspective views showing a connector according to various embodiments of the present disclosure.
Figure 7B:
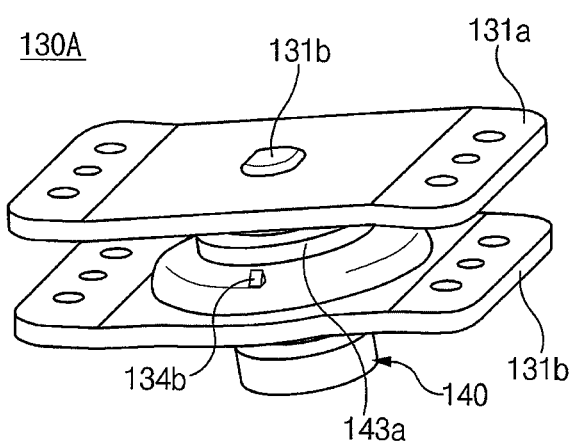
Figure 8:
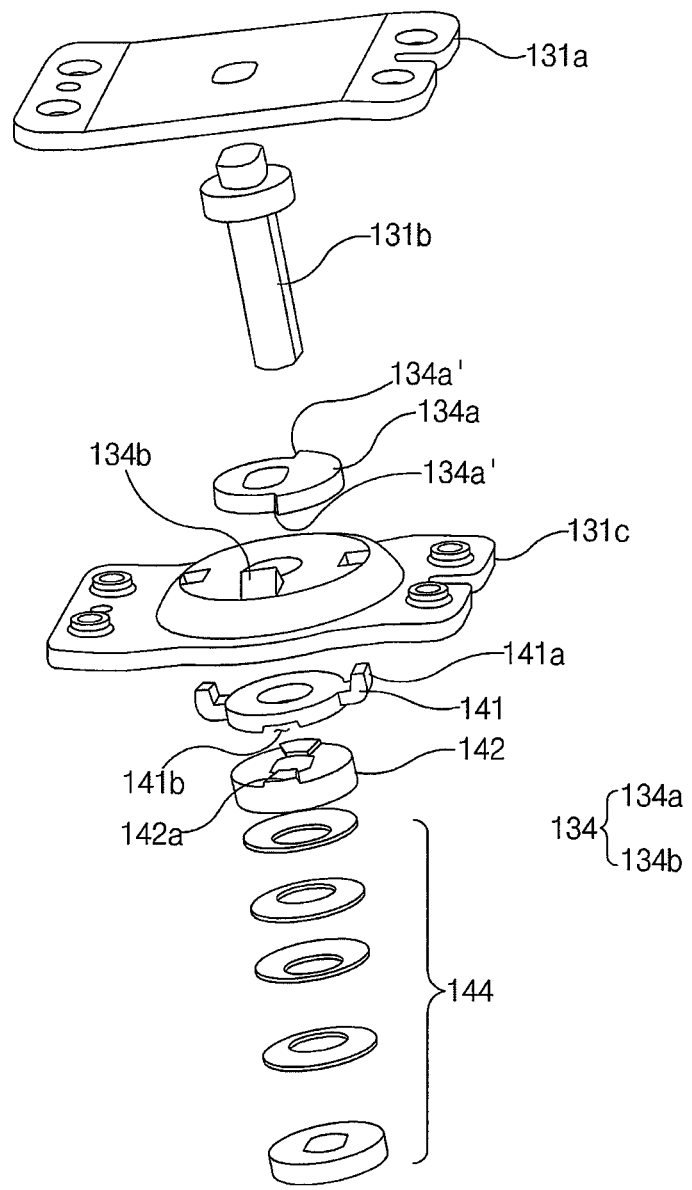
FIG. 8 is a front view showing a supporter according to various embodiments of the present disclosure.

In some embodiments, referring to FIGS. 5, 7A, and 7B, a connector 130A may include a first coupling plate 131a fixed to the holder 110A, a second coupling plate 131c fixed to the supporter 120, and a first rotating pivot 131b penetrating through the first coupling plate 131a and the second coupling plate 131c.

According to various embodiments, the first coupling plate 131a may be provided with a hole formed there through, into which a protruding member 141a protruded from a lower surface of the holder 110A is inserted, and may be coupled to the holder 110A while the protrusion member 114 is inserted into the hole. For example, the first coupling plate 131 may be coupled to the holder 110A by a bolt or a screw after the protrusion member 114 is inserted into the hole.

According to various embodiments, the second coupling plate 131c may be spaced apart from the first coupling plate 1341a in a longitudinal direction of the first rotating pivot 131b. In detail, the second coupling plate 131c may be provided with a hole formed there through, into which a protruding member 141a protruded from the lower surface of the supporter 120 is inserted, and may be coupled to the supporter 120 while the protrusion member 114 is inserted into the hole.

According to various embodiments, the first rotating pivot 131b may be disposed to penetrate through the first coupling plate 131a and the second coupling plate 131c, and the first coupling plate 131a and the second coupling plate 131c may rotate around the first rotating pivot 131b.

According to various embodiments, the first coupling plate 131a and the second coupling plate 131c may be disposed to be idled without being fixed to the first rotating pivot 131b, and the first coupling plate 131a may be fixed to the first rotating pivot 131b, but the first rotating pivot 131b may be disposed to be idled without being fixed to the second coupling plate 131c. That is, the connector 130A may have various structures as long as the holder 110A coupled to the first coupling plate 131a may be rotated without being interlocked with the supporter 120.

Figure 6:
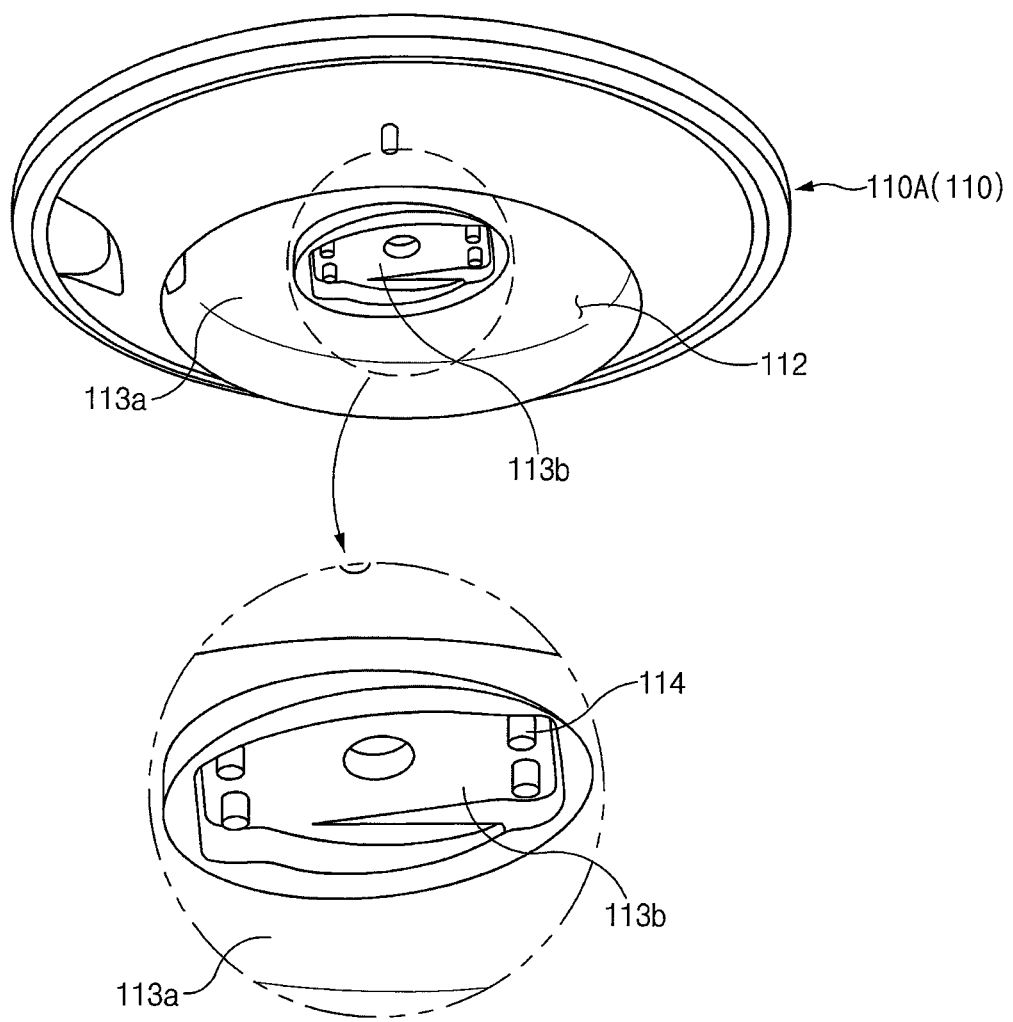
FIG. 6 is a perspective view showing a connector according to various embodiments of the present disclosure.

Referring to FIGS. 6, 7A and 7B, the connector 130A according to various embodiments may further include a first cam 140 to allow the holder 110A to be maintained in a rotated state after the holder 110A is rotated to a predetermined angle. According to various embodiments, the first cam 140 may include a first cam member 141 configured to include a pocket 141b formed in a lower surface thereof and a protrusion member 141a disposed on an upper surface thereof, which is inserted into the hole of the second coupling plate 131c, and a second cam member 142 configured to include a pocket insertion member 142a inserted into the pocket 141b formed on the lower surface of the first cam member 141.

The first rotating pivot 131b may be inserted into the first cam member 141, but the first rotating pivot 131b may be idled since the first cam member 131 is not coupled to the first cam member 141, and the second cam member 142 may be coupled to and fixed to the first rotating pivot 131b, and thus the second cam member 142 may be rotated in a linked fashion by means of the first rotating pivot 131b.

Accordingly, when the first rotating pivot 131b rotates, the second cam member 142 may be rotated in a linked fashion by the first cam member 141 and the pocket insertion member 142a formed on the second cam member 142 may be repeatedly inserted into a plurality of pockets 141b formed in the lower surface of the first cam member 141. Thus, the rotation angle of the holder 110A coupled with the first rotating pivot 131b may be maintained after the holder 110A is rotated. In this case, since the protrusion member 141a is inserted into the hole formed through the second coupling plate 131c, the first cam member 141 may reciprocally move in the up-and-down direction when the first rotating pivot 131b is rotated.

According to various embodiments, the first cam 140 may include a plate-shaped spring 144 that is disposed under the second cam member 142 to provide an elastic force.

Referring to FIGS. 7A and 7B, the first cam 140 according to various embodiments may further include a stopper 134 to restrict a maximum rotation angle of the holder 110A. According to various embodiments, the stopper 134 may include a first stopper 134a coupled with the first rotating pivot 131b and a second stopper 134b protruded upward from the second coupling plate 131c. In the case where the first rotating pivot 131b is rotated, a stepped portion 134a' formed on the first stopper 134a may collide with the second stopper 134b in accordance with a position of the second stopper 134b and the rotation of the first rotating pivot 131b may be restricted. Accordingly, the rotation of the first coupling plate 131a and the holder 110A, which are coupled with the first rotating pivot 131b, may be restricted.

Figure 9:
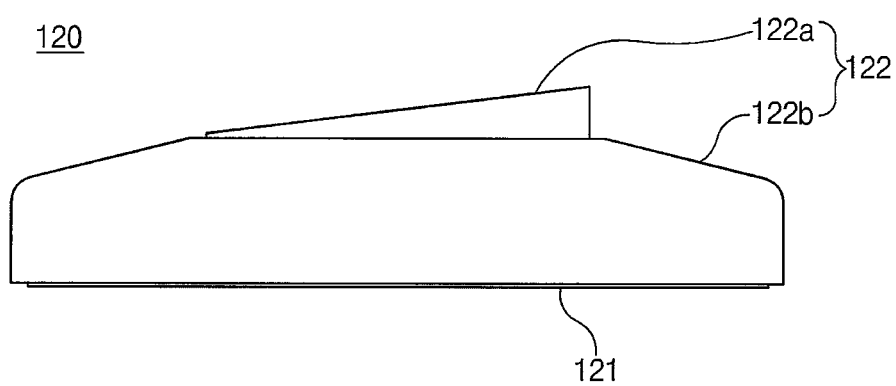
FIG. 9 is a view showing an operation state of a wireless power charging device according to various embodiments of the present disclosure.

Referring to FIG. 9, in the connector 130A according to various embodiments, when the holder 110A is rotated, the first rotating pivot 131b may be disposed to be inclined at the predetermined angle with respect to the lower surface 121 of the supporter 120 such that the upper surface 111 of the holder 110A forms the predetermined angle with the lower surface 121 of the supporter 120.

To this end, as an example, each of the first coupling plate 131a and the second coupling plate 131c may be vertically coupled to the first rotating pivot 131b and a lower surface 113a of the holder 110A and a upper surface 122a of the holder 120, which are respectively coupled to the first and second coupling plates 131a and 131c, may be inclined at the predetermined angle. Therefore, in the case where the first coupling plate 131a and the second coupling plate 131c are respectively coupled to the holder 110A and the supporter 120, the first rotating pivot 131b may be inclined at the predetermined angle with respect to the lower surface 121 of the supporter 120.

However, a coupling relation between the first coupling plate 131a, the second coupling plate 131c, and the first rotating pivot 131b should not be limited to the above-mentioned embodiments as long as the first rotating pivot 131b may be inclined at the predetermined angle with respect to the lower surface of the supporter 120.

According to various embodiments, the holder 110A may include a hollow 112 formed by inwardly recessing a portion of the lower surface of the holder 110A in order to prevent or avoid the lower surface of the holder 110A from being interfered by and from colliding with the upper surface of the supporter 120 in the case where the holder 110A is rotated while being inclined at the predetermined angle with respect to the lower surface of the supporter 120.

In addition, an inner circumferential surface 113b of the holder 110A may have a shape corresponding to that of the upper surface 122b of the supporter 120 to allow the inner circumferential surface 113b not to overlap with the upper surface of the holder 110A when the holder 110A is rotated.

For example, the upper surface 122b of the supporter 120, into which the connector 130A is inserted, and the lower surface 113b of the holder 110A, which makes contact with the upper surface 122b of the supporter 120, may be inclined at an angle two times greater than the angle between the first rotating pivot 131b and the lower surface of the supporter 120.

Accordingly, in the case where the holder 110A is rotated to a position at which the holder 110A is inclined at a maximum angle, the lower surface 113b of the holder 110A and the upper surface 122b of the supporter 120 may not be interfered with each other and a distance may be formed between the lower surface 113b of the holder 110A and the upper surface 122b of the supporter 120, thereby forming inclined surfaces corresponding to each other.

Figure 10A:
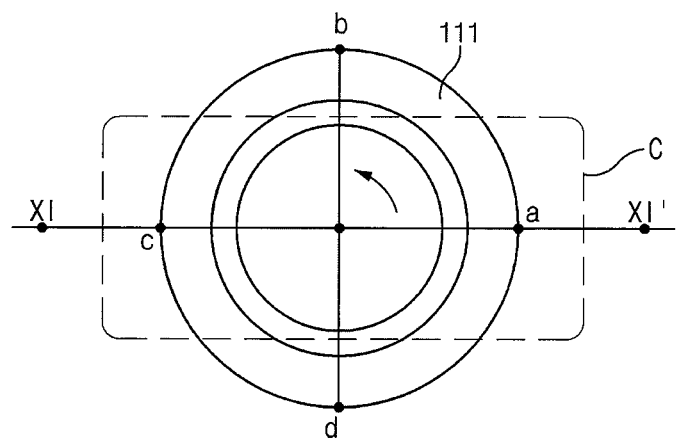
Figure 10B:
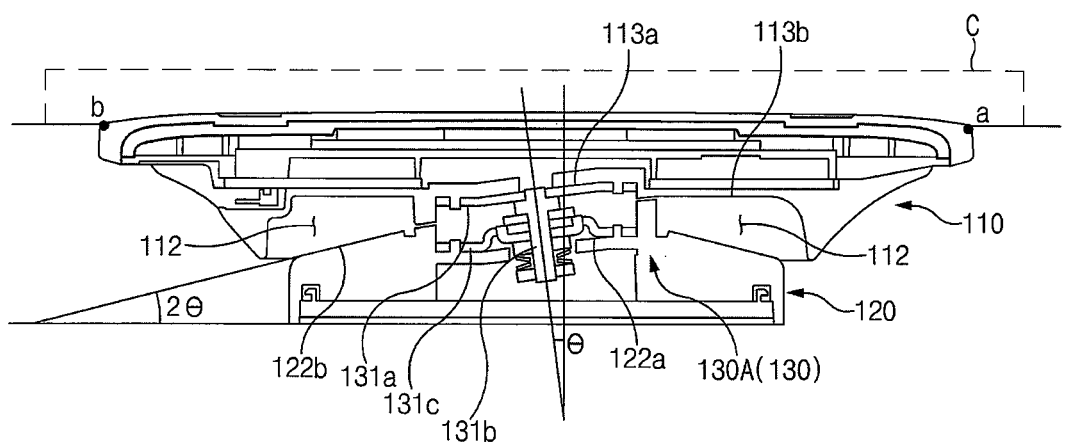

In such embodiments, referring to FIGS. 10A and 10B, when a state in which the wireless power charging device 100 is placed on the bottom surface and the upper surface of the holder 110 is substantially parallel to the lower surface of the supporter 120 is referred to as an initial state, the angle between the upper surface of the holder 110 and the lower surface of the supporter 120 may be varied depending on the rotation angle of the holder 110 in the case where the holder 110 is rotated in a clockwise or counter-clockwise direction.

FIGS. 10B to 10D show a cross-sectional view taken along a line X1-X1' of the holder 110A shown in FIG. 10A. In detail, referring to FIG. 10B, the upper surface of the holder 110A may be substantially parallel to the lower surface of the supporter 120 in the initial state. Referring to FIG. 10C, in the case where the holder 110A is rotated by about 90 degrees, the upper surface 111 of the holder 110A may be inclined by an angle θ between the lower surface 121 of the supporter 120 and the first rotating pivot 131b.

Referring to FIG. 10D, in the case where the holder 110A is rotated by about 180 degrees, the upper surface 111 of the holder 110A may form a maximum angle 2θ with the lower surface 121 of the supporter 120. In this case, the angle 2θ between the upper surface 111 of the holder 110A and the lower surface 121 of the supporter 120 may be two times greater than the angle θ between the lower surface 113b of the holder 110A and the first rotating pivot 131b.

Therefore, according to various embodiments of the wireless charging device 100, in the case where the holder 110A or the electronic device is rotated after the electronic device is placed on the holder 110A, the angle between the upper surface 111 of the holder 110A and the lower surface 121 of the supporter 120 may be varied, and thus the screen of the electronic device and the bottom surface may form any desired angle for the user.

According to various embodiments, although the holder 110A is rotated after the electronic device is placed on the upper surface of the holder 110A, the screen of the electronic device may be controlled to achieve the desired angle without moving the electronic device. Thus, since the second coil part (not shown) disposed in the electronic device may be prevented from being displaced from the position corresponding to the first coil part 171, a charging performance of the electronic device may not be affected by the rotation of the holder 110A.

In some embodiments, referring to FIGS. 10A, 10B, 10C, 10D, 11, 12A, 12B, and 13, a connector 130B may include a first connector 132a configured to include an upper portion coupled to a holder 110B and a lower portion on which a protrusion portion 132d is protruded outward from an outer circumferential surface of the lower portion.

According to various embodiments, the supporter 120 may include an insertion recess 124 formed in an inner surface of the supporter 120, into which the protrusion portion 132d is inserted, such that the first connector 132a is rotated while being inserted into the supporter 120 without being separated.

The insertion recess 124 may form a predetermined angle with the lower surface of the supporter 120 when viewed in a plan view and may be formed in an inner circumferential surface of the supporter 120. Accordingly, in the case where the protrusion portion 132d is inserted into the insertion recess 124 formed inclined to the lower surface of the supporter 120 and the holder 110B is rotated in a clockwise or counter-clockwise direction while the lower surface makes contact with a stepped portion 122d formed by the insertion recess 124, the first connector 132a may be rotated while being inserted into the supporter 120.

Therefore, the first connector 132a may connect the holder 110B and the supporter 120 such that the holder 110B is rotated in the state in which the holder 110B forms the predetermined angle with the supporter 120.

Figure 11:
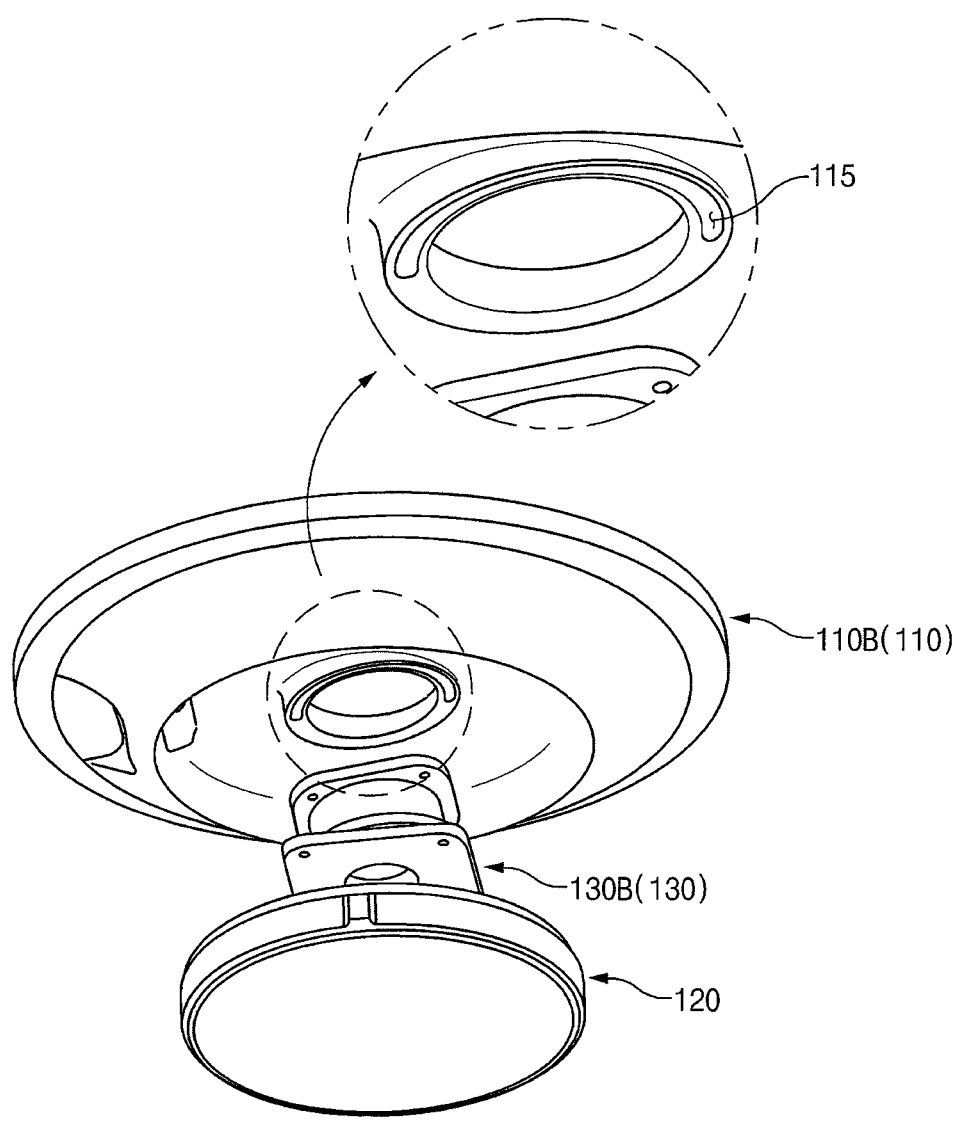
FIG. 11 is a perspective view showing a connector according to various embodiments of the present disclosure.
Figure 12A:
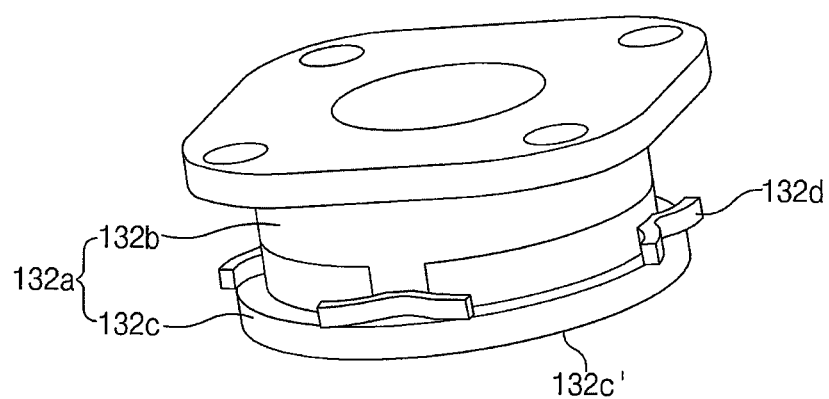
FIGS. 12A and 12B are perspective views showing a supporter according to various embodiments of the present disclosure.
Figure 12B:
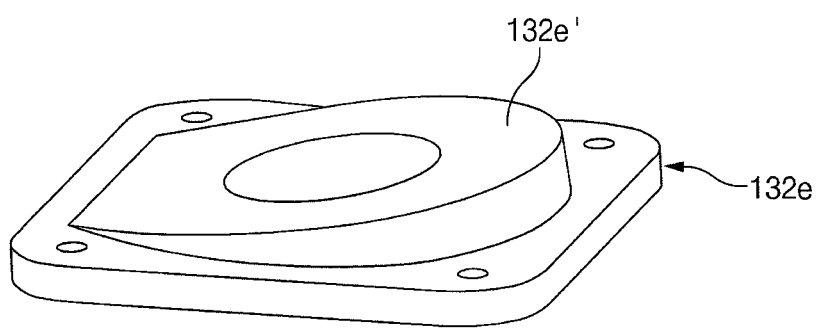
Figure 13:
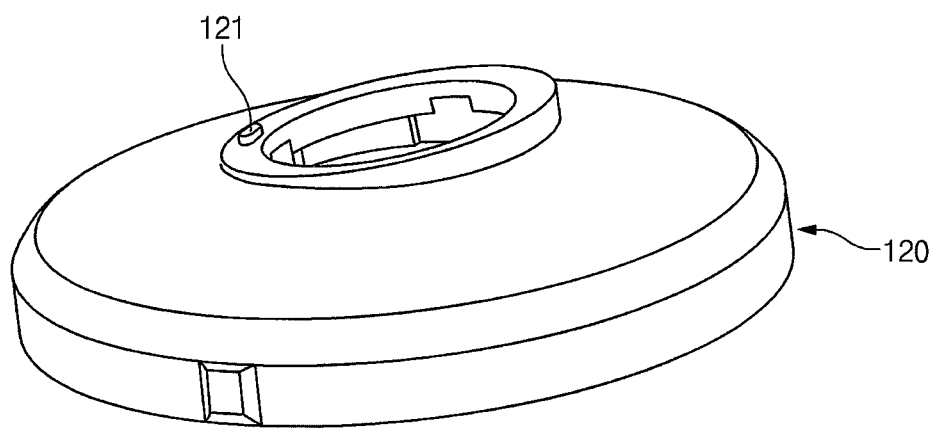
FIG. 13 is a view showing a wireless power charging device according to various embodiments of the present disclosure.

Referring to FIGS. 11 and 13, the connector 130B according to various embodiments may further include a second connector 132e coupled to an upper center portion of the supporter 120. The second connector 132e may include an upper surface 132e spaced apart from a lower surface 132c' of the first connector 132a and may be inclined at the same angle as the lower surface 132c' of the first connector 132a. Thus, the lower surface 132c' of the first connector 132a and the upper surface 132e' of the connector 132e may be inclined at the predetermined angle with respect to the lower surface 121 of the supporter 120 when viewed in a plan view.

According to various embodiments, the first connector 132a may include two members, such as a first-first connector 132b and a first-second connector 132c. The first-first connector 132b disposed at a relatively upper portion may be inserted into and coupled with the holder 110B and the first-second connector 132c may be inserted into the insertion recess 124 and coupled with the first-first connector 132b, thereby forming the first connector 132a.

Figure 14:
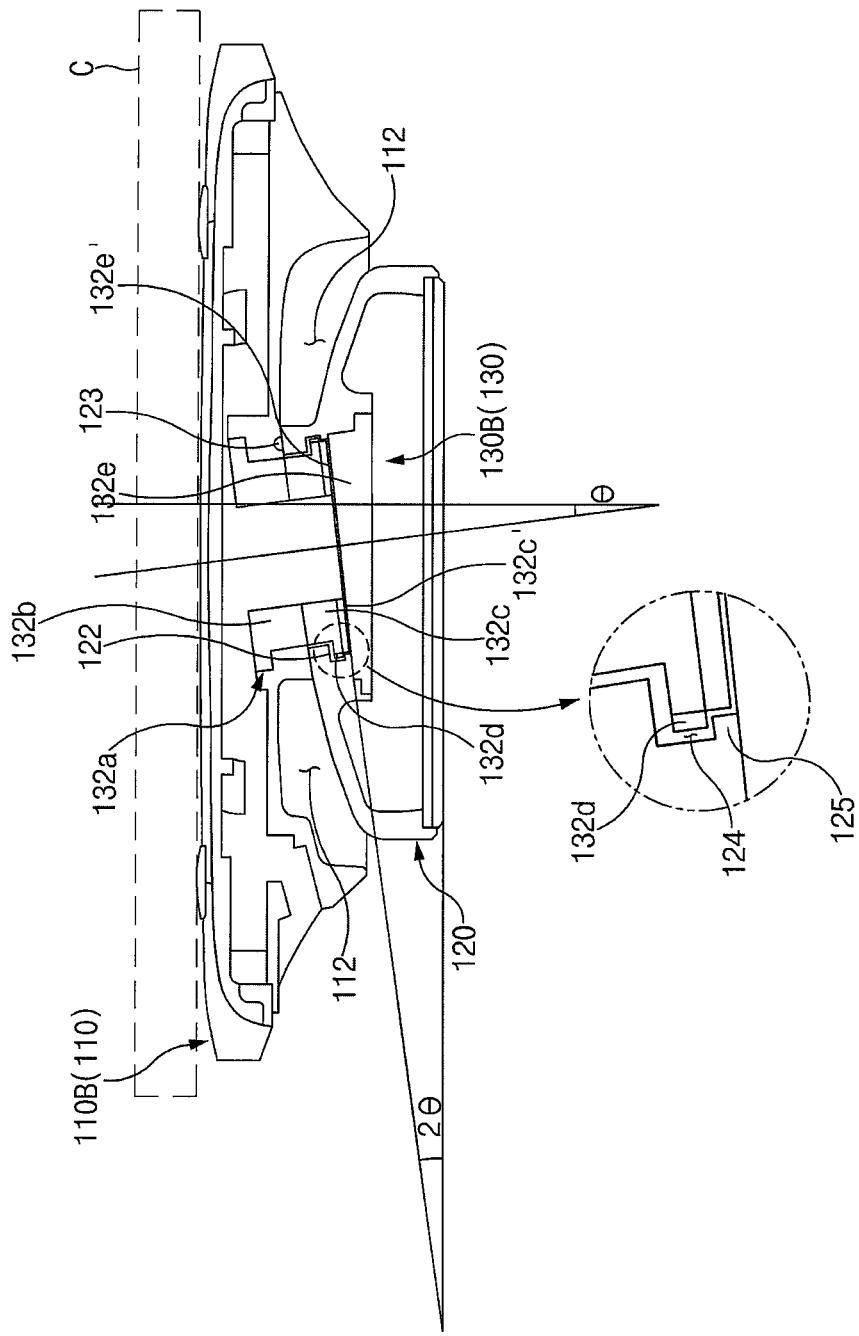
FIG. 14 is a view showing an operation state of a wireless power charging device according to various embodiments of the present disclosure.
Figure 15A:
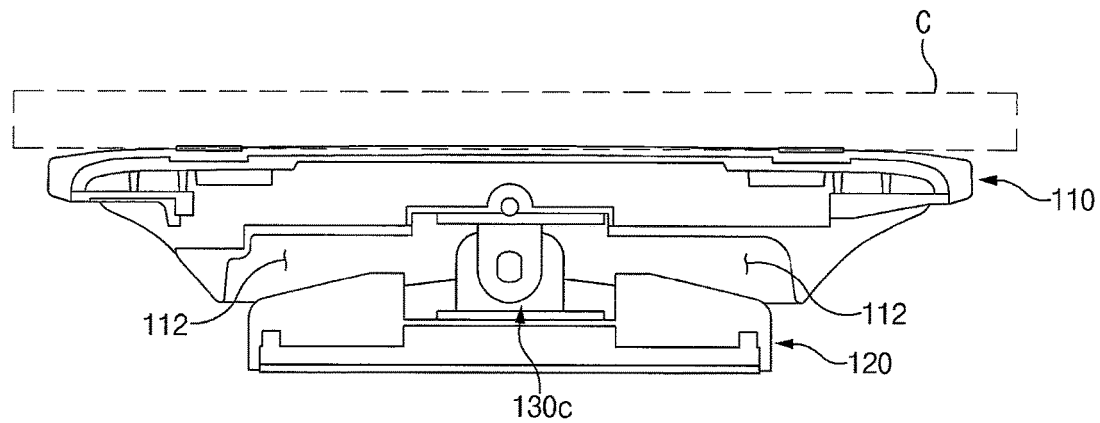
FIGS. 15A and 15B are perspective views showing a connector according to various embodiments of the present disclosure.
Figure 15B:
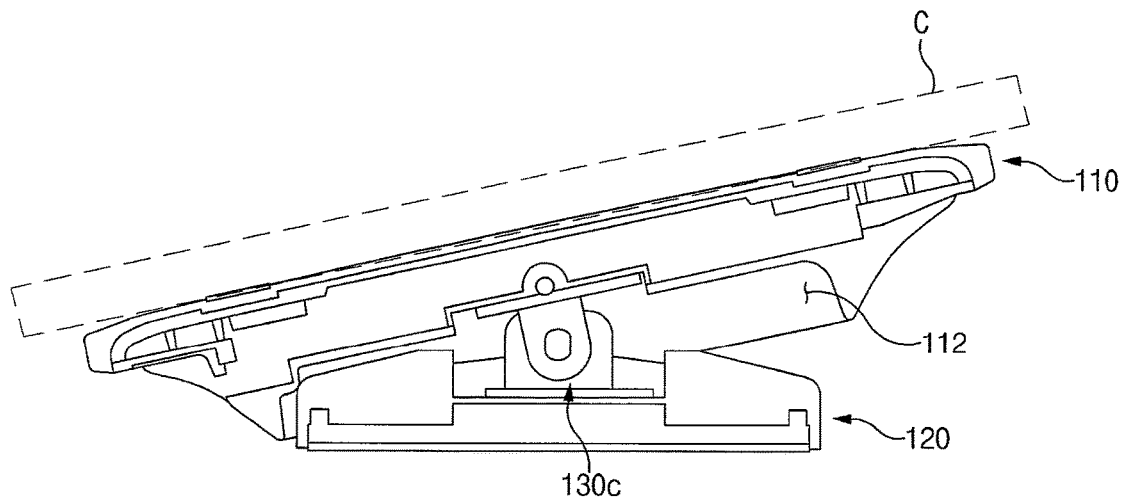

Referring to FIGS. 13 and 14, according to various embodiments of the supporter 120, the holder 110B may include a guide protrusion 123 protruded upwardly and a guide recess 115, into which the guide protrusion 123 is inserted, to restrict the rotation angle of the holder 110B when the holder 110B is rotated.

According to various embodiments, the guide recess 115 may be defined by a portion of a circle, in which a center of the lower surface of the holder 110B matches with a center of the holder 110B, and the rotation angle of the holder 110B may be restricted by a length of the guide recess 115. According to various embodiments, the holder 110B may include a hollow formed by inwardly recessing a portion of the lower surface of the holder 110B in order to prevent or avoid the lower surface of the holder 110B from being interfered by the upper surface of the supporter 120 in the case where the holder 110B is rotated.

In such embodiments, the upper surface of the holder 110B may form the predetermined angle with a longitudinal direction of the connector 130B and may be coupled with the upper portion of the connector 130B, and the protrusion portion 132b may be inserted into the insertion recess 124.

Accordingly, the connector 130B may be rotated while being coupled with the supporter 120.

Therefore, in the case where the holder 110B is rotated, since the connector 130B coupled with the holder 110B may be rotated and may be coupled with the supporter 120 to form the predetermined angle when viewed in a plan view, the upper surface of the holder 110B may form the predetermined angle with the lower surface of the supporter 120 when viewed in a plan view according to the rotation of the holder 110B. Descriptions the same as those of aforementioned embodiments will be omitted in order to avoid redundancy.

In some embodiments, referring to FIGS. 14, 15A, 15B, 16A, and 16B, a connector 130C may include a second rotating pivot 133a with which a second cam 133d is coupled, a third connector 133b configured to include an upper surface coupled with the holder 110 and a side surface coupled with the second rotating pivot 133a, and a fourth connector 133c configured to include a lower surface coupled with the supporter 120 and a side surface coupled with the second rotating pivot 133a.

According to various embodiments, the side surface of the third connector 133b may be coupled with the second rotating pivot 133a and the side surface of the fourth connector 133c may be connected to the second rotating pivot 133a. Accordingly, the third connector 133b and the fourth connector 133c may be independently rotated with respect to the second rotating pivot 133a.

Figure 16A:
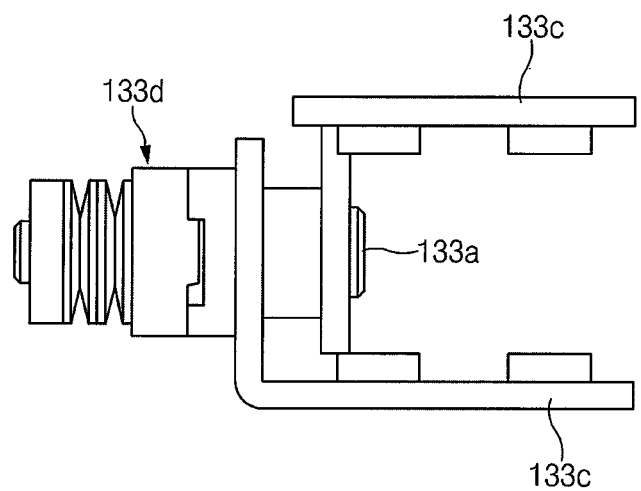
FIGS. 16A and 16B are exploded perspective views showing a connector according to various embodiments of the present disclosure.
Figure 16B:
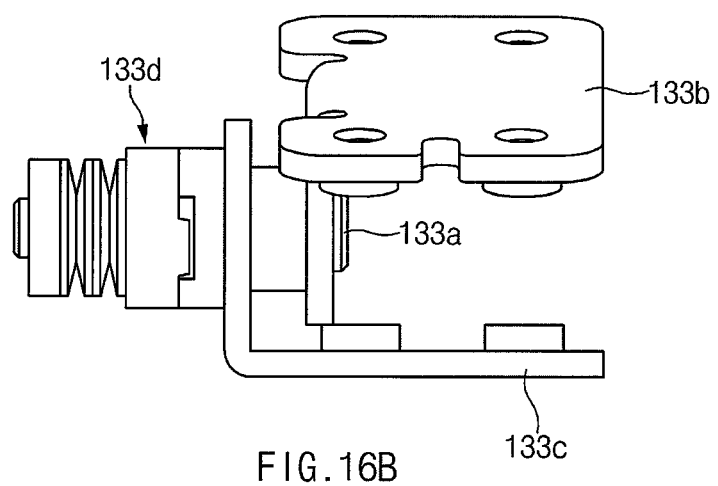
Figure 17:
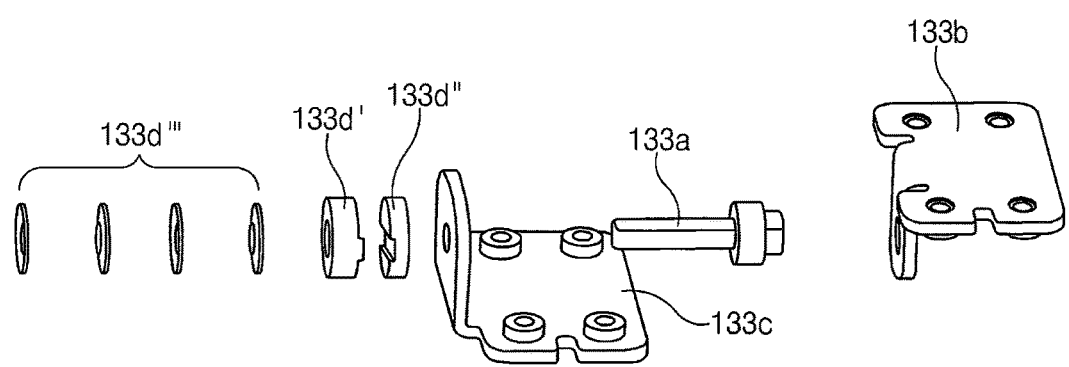
FIG. 17 is a perspective view showing a connector according to various embodiments of the present disclosure.
Figure 18:
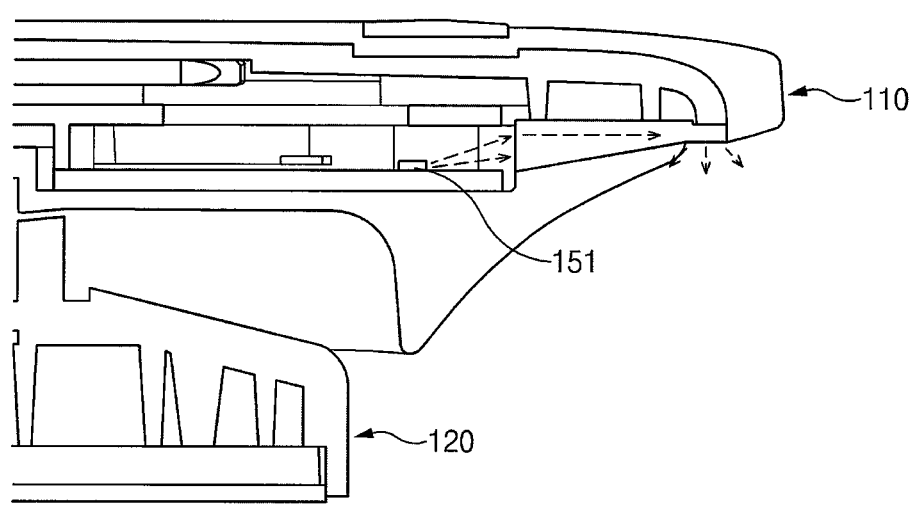
FIG. 18 is a view showing a light-emitting state of a display unit according to various embodiments of the present disclosure

Referring to FIGS. 16A, 16B, and 17, the second cam 133d may include a third cam member 133d' in which a pocket is formed, a fourth cam member 133d'' facing the first cam member 133d' and including a protrusion formed thereon and inserted into the pocket, and a plate-shaped spring 133d''' to provide an elastic force.

In the case where the second cam 133d is coupled with the second rotating pivot 133a and the third connector 133b or the fourth connector 133c is rotated, due to the same principle of the first cam as described in Embodiment 1, the second cam 133d may maintain the third and fourth connectors 133b and 133c at a predetermined angle in accordance with the number of the protrusions and intervals between the protrusions.

Referring to FIG. 14, according to various embodiments, the third connector 133b may be connected to the holder 110 and the fourth connector 133c may be connected to the supporter 120. Therefore, in the case where one side portion of the holder 110 is pressurized after the holder 120 is placed on the bottom surface, the holder 110 may be rotated with respect to the second rotating pivot 133a and the upper surface 111 of the holder 110 and the lower surface 121 of the supporter 120 may be maintained at the predetermined angle by the cam.

In such embodiments, the holder 110 may include a hollow formed by inwardly recessing a portion of the lower surface of the holder 110 in order to prevent or avoid the holder 110 from being interfered by the supporter 120 in the case where the holder 110 is rotated.

Figure 2A:
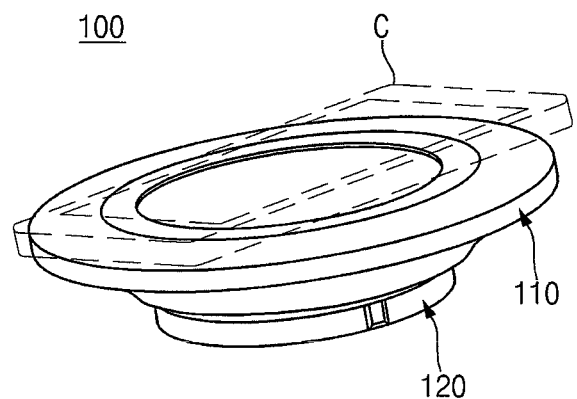
FIGS. 2A and 2B are exploded perspective views showing a wireless power charging device according to various embodiments of the present disclosure.
Figure 2B:
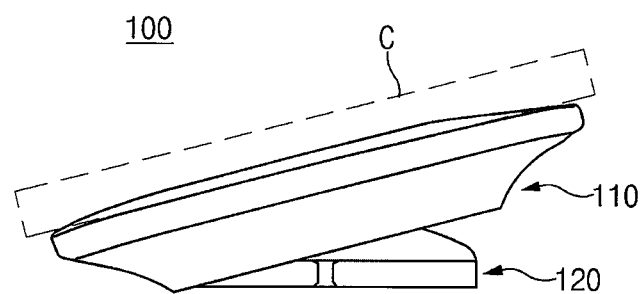

Referring to FIGS. 2A, 2B, and 17, the holder 110 according to various embodiments may further include a display unit 150. The display unit 150 may be a lighting fixture 151, such as an LED lamp.

The display unit 150 may indicate a state of charger and a status of the electronic device through the lighting fixture 151. In addition, the display unit 150 according to various embodiments may indicate the state of charger and the status of the electronic device to the outside using an internal or external light source, and thus may be utilized as an indicator. For example, in the case where a notification, such as telephone or text, arrives, the display unit 150 may inform the user with the notification by emitting lights having different colors. As another embodiment, in the case where the user listens to music while a terminal is mounted, the light may be emitted based on a predetermined pattern or randomly emitted in accordance with a sound source information and may inform the user with the charging status through different color lights according to the battery status. The internal light source may be, but not limited to, an LED. The display unit 150 according to various embodiments may be, but not limited to, a transmissive or semi-transmissive plastic, to which a diffusion lens is applied, to effectively transmit the internal or external light source, or may include a material, e.g., a transmissive or semi-transmissive plastic or glass, in which a separate waveguide is included.

According to various embodiments, the display unit 150 may be disposed in the holder 110, but the light emitted from the display unit 150 may travel to the outside of the holder 110, and thus the above-mentioned status may be indirectly indicated.

According to various embodiments, the holder 110 may include the charger 170 disposed on the upper surface to charge the electronic device. According to various embodiments, the charger 170 may include the first coil part 171 that converts the power provided through an external power input terminal 160 to a power appropriate to the electronic device placed on the upper surface using the electromagnetic induction phenomenon and applies the converted power to the electronic device and a wireless charging driver 172 that performs the overall wireless charging function to apply the power provided through the external power input terminal 160 to the electronic device placed on the upper surface as a power appropriate to the electronic device.

Figure 19:
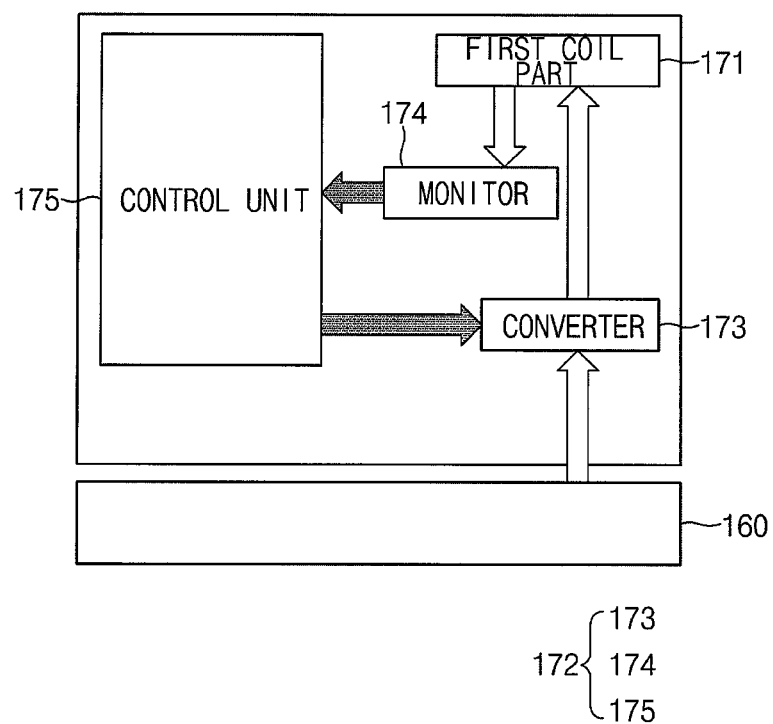
FIG. 19 is a view showing a wireless charging driver according to various embodiments of the present disclosure.

Referring to FIG. 19, the wireless charging driver 172 according to various embodiments may include a converter 173 that converts the power provided through the external power supply to the power appropriate to the electronic device placed on the upper surface, a monitor 174 that senses (e.g., sensing of current or voltage) a status of the power converted by the converter 173 or a signal provided from the electronic device placed on the upper surface of the holder 110, and a controller 175 that analyzes the signal sensed by the monitor 174 to control the external power supply or the converter 173.

In some embodiments, the holder 110 or the supporter 120 may further include a short range communication module, such as a near field communication (NFC) module, disposed therein or an input device, such as a touch pad, disposed to be exposed to the outside. In addition, the holder 110 or the supporter 120 may further include a sound device, such as a speaker module, a microphone, etc., an antenna module, or a sensor, such as a fingerprint sensor, a gas sensor, etc.

According to various embodiments, the holder 110 or the supporter 120 may further include additional components in addition to the wireless charging driver 172. For example, the holder 110 or the supporter 120 may include the display unit, such as a display, an LED, etc., a display device, such as a keypad, a touch display, an LED, etc., an input device, such as a keypad, a touch pad, etc., a sound device, such as a speaker module, a microphone, etc., an antenna module, such as a BT, Wi-Fi, etc., or sensors, such as a fingerprint sensor, a gas sensor, etc., required or used to sense an external environment. As another way, two or more components may be applied together to the holder 110 or the supporter 120. For example, in the case where the antenna module and the sound device are applied together to the holder 110 or the supporter 120, the music may be reproduced while the electronic device is mounted on the charger or the electronic device is in a wireless-pairing status after the electronic device is mounted on the charger.

Figure 20:
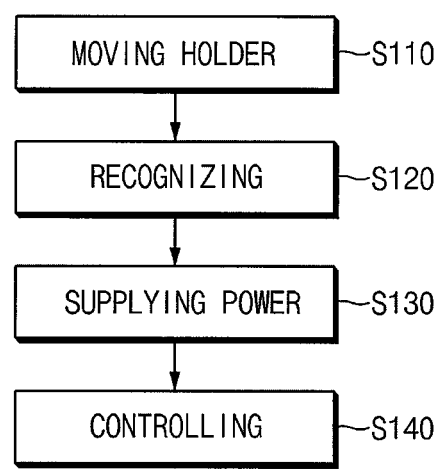
FIG. 20 is a flowchart showing a method of wireless charging according to various embodiments of the present disclosure.

In addition, referring to FIG. 20, a wireless charging method using the wireless power transmission device according to various embodiments may include moving the holder 110 to watch the wireless power transmission device according to the above-mentioned various embodiments at the user's desired angle S110, recognizing an access of the electronic device S120 after the moving of the holder 110, and supplying the power to the electronic device after the recognizing of the access of the electronic device S130.

According to various embodiments, due to the moving of the holder S110, the holder may move to a position corresponding to the supporter. The user may place the wireless power transmission device on the upper surface of the holder and move the holder to another position, on which the electronic device is placed. The user may rotate the holder to allow the holder to be placed at a position corresponding to the user's desired angle. The user may directly move the holder or indirectly move the holder using an actuator, such as a motor.

According to various embodiments, the recognizing of the access of the electronic device S120 is performed by installing a hall sensor in the charger 170 and installing a magnetic material in the electronic device to sense a magnetic field using the hall sensor, or by sensing a resonance generated from the electronic device accessing to the charger 170 or a variation in capacitance of the electronic device, but the recognizing of the access of the electronic device S120 should not be limited thereto or thereby.

In the supplying of the power S130 according to various embodiments, an alternating current may be directly input to the first coil part 171 or an alternating current obtained by converting a direct current using the converter may be input to the first coil part 171. In this case, the converter may serve as an inverter and may be controlled by a predetermined operating frequency.

According to various embodiments, the wireless charging method may further include controlling to stop the charging of the electronic device S140 after the supplying of the power S130 in the case where the power supplied to the first coil part 171 is varied in accordance with a signal provided from the monitor 174, the charging of the electronic device is completed, or the electronic device is detached from the holder 110.

According to various embodiments of the present disclosure, since the angle of the holder may be changed to the user's desired angle after the electronic device is placed on the holder, the user may watch the screen of the electronic device placed on the holder at the desired angle.

In addition, although the electronic device is disposed at the user's desired angle, the charging efficiency of the electronic device may be prevented from being degraded.

A module or a programming module according to an embodiment of the present disclosure may include at least one of the above elements, or a portion of the above elements may be omitted, or additional other elements may be further included. Operations performed by a module, a program module, or other elements according to an embodiment of the present disclosure may be executed sequentially, in parallel, repeatedly, or in a heuristic method. Also, a portion of operations may be executed in different sequences, omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless power transmission device comprising:
    a holder comprising a charger disposed therein, the charger configured to charge an electronic device;
    a supporter configured to support the holder; and
    a connector configured to connect the holder to the supporter and apply an external force to the holder such that an upper surface of the holder forms a predetermined angle with a lower surface of the supporter, the lower surface disposed on a bottom of the supporter,
    wherein the connector comprises:
        a first coupling plate fixed to the holder;
        a second coupling plate spaced apart from the first coupling plate and fixed to the supporter; and
        a first rotating pivot penetrating through the first coupling plate and the second coupling plate, at least one of the first coupling plate and the second coupling plate configured to be rotated with respect to the first rotating pivot that is disposed to form a predetermined angle with the lower surface of the supporter.

2. The wireless power transmission device of claim 1, wherein the connector is configured to connect the holder to the supporter, such that the holder is rotatable.

3. The wireless power transmission device of claim 2, wherein the connector comprises an upper portion coupled with the holder and a lower portion from which a protrusion is protruded outwardly along an outer circumferential surface thereof, the supporter comprising an insertion recess formed along an inner circumferential surface of the supporter, and the protrusion is inserted into the insertion recess such that the connector is rotated without being separated.

4. The wireless power transmission device of claim 3, wherein the insertion recess is formed in the inner circumferential surface of the supporter to form a predetermined angle with the lower surface of the supporter and a longitudinal direction of the connector forms a predetermined angle with the upper surface of the holder.

5. The wireless power transmission device of claim 4, wherein the connector comprises:
    a first connector comprising an upper portion coupled with the holder and a lower portion, on which a protrusion is formed, to form a predetermined angle with the upper surface of the holder; and
    a second connector coupled with the supporter and comprising an upper surface disposed adjacent to a lower surface of the first connector, the lower surface of the first connector and the upper surface of the second connector being disposed to form a predetermined angle with the lower surface of the supporter.

6. The wireless power transmission device of claim 5, wherein the supporter further comprises a guide protrusion protruded from an upper portion of the supporter toward the holder comprising a guide recess with a circular shape, into which the guide protrusion is inserted, to restrict a rotation angle of the holder when the holder is rotated.

7. The wireless power transmission device of claim 1, wherein the first coupling plate and the second coupling plate are connected to the first rotating pivot to be substantially parallel to each other.

8. The wireless power transmission device of claim 1, wherein the connector further comprises a first cam disposed on the first rotating pivot to maintain a rotation angle of the holder after the holder is rotated.

9. The wireless power transmission device of claim 8, wherein the first cam comprises a stopper configured to allow the holder to be rotated in a predetermined angle range.

10. The wireless power transmission device of claim 1, wherein the connector comprises:
   a second rotating pivot provided with a second cam coupled therewith;
   a third connector comprising an upper surface coupled with the holder and a side surface coupled with the second rotating pivot; and
   a fourth connector comprising a lower surface coupled with the supporter and a side surface coupled with the second rotating pivot.

11. The wireless power transmission device of claim 10, wherein the supporter comprises a hollow formed by inwardly recessing a portion thereof to avoid the lower surface of the holder from being interfered with the upper surface of the supporter when the holder is rotated with respect to the second rotating pivot.

12. The wireless power transmission device of claim 1, wherein the holder further comprises a display unit disposed on an inner or outer portion of the holder to indicate a state of the electronic device placed on the holder or the charger.

13. The wireless power transmission device of claim 1, wherein the holder or the supporter further comprises an external power input terminal such that an external power is provided.

14. The wireless power transmission device of claim 1, wherein the charger comprises:
   a first coil part configured to apply a power due to an electromagnetic induction; and
   a wireless charging driver configured to control the first coil part.

15. The wireless power transmission device of claim 14, wherein the wireless charging driver comprises:
   a converter configured to convert the power provided through an external power input terminal to a power appropriate to the electronic device placed on the upper surface of the holder;
   a monitor configured to sense a state of the converted power by the converter or sensing a signal provided from the electronic device placed on the upper surface of the holder; and
   a controller configured to analyze the signal sensed by the monitor to control the external power input terminal or the converter.

16. The wireless power transmission device of any one of claim 1, wherein at least one of the charger, the supporter, and the holder comprise at least one of an input device configured to receive a user input, a sound device, an antenna, and a sensor.

17. The wireless power transmission device of any one of claim 1, wherein the lower surface of the supporter further comprises a non-slip member to avoid slippage.

18. A wireless charging method comprising:
   varying a position of a holder of a charging device on which an electronic device is placed on an upper surface of the holder;
   connecting, by a connector, the holder to a supporter and applying an external force to the holder surface such that an upper surface of the holder forms a predetermined angle with a surface of the supporter;
   recognizing, by the charging device, an access of the electronic device; and
   supplying a power to the electronic device,
   wherein the connector comprises:
      a first coupling plate fixed to the holder;
      a second coupling plate spaced apart from the first coupling plate and fixed to the supporter; and
      a first rotating pivot penetrating through the first coupling plate and the second coupling plate, at least one of the first coupling plate and the second coupling plate configured to be rotated with respect to the first rotating pivot that is disposed to form a predetermined angle with the second surface of the supporter.

19. The method of claim 18, further comprising controlling a power provided to a wireless power receiving device after the supplying of the power to the electronic device.

* * * * *